April 15, 1930. P. S. SHIELD 1,755,153
SELECTIVE VALVE ACTUATING MEANS
Filed Jan. 30, 1929 3 Sheets-Sheet 1
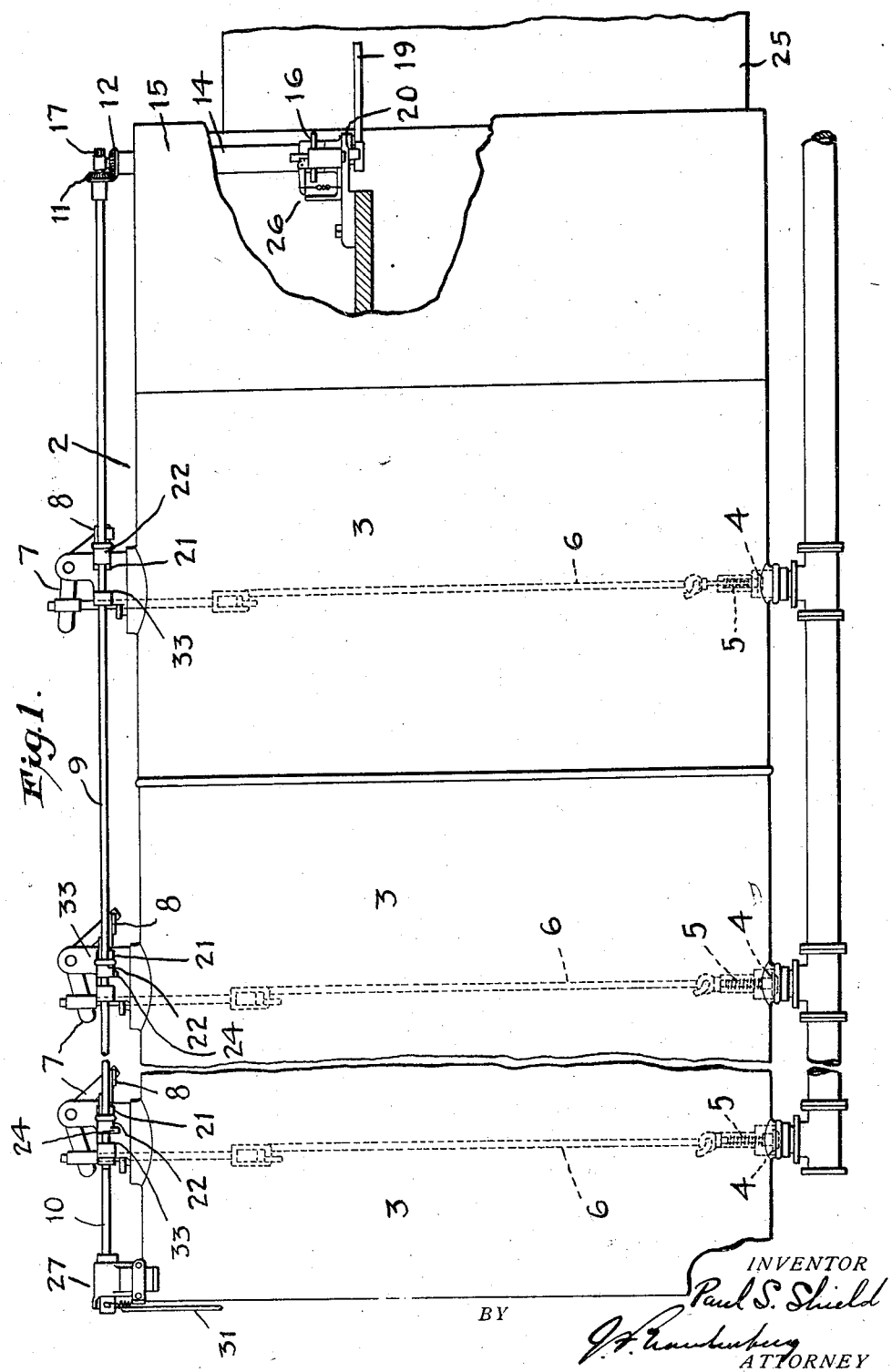
INVENTOR
Paul S. Shield
BY
ATTORNEY

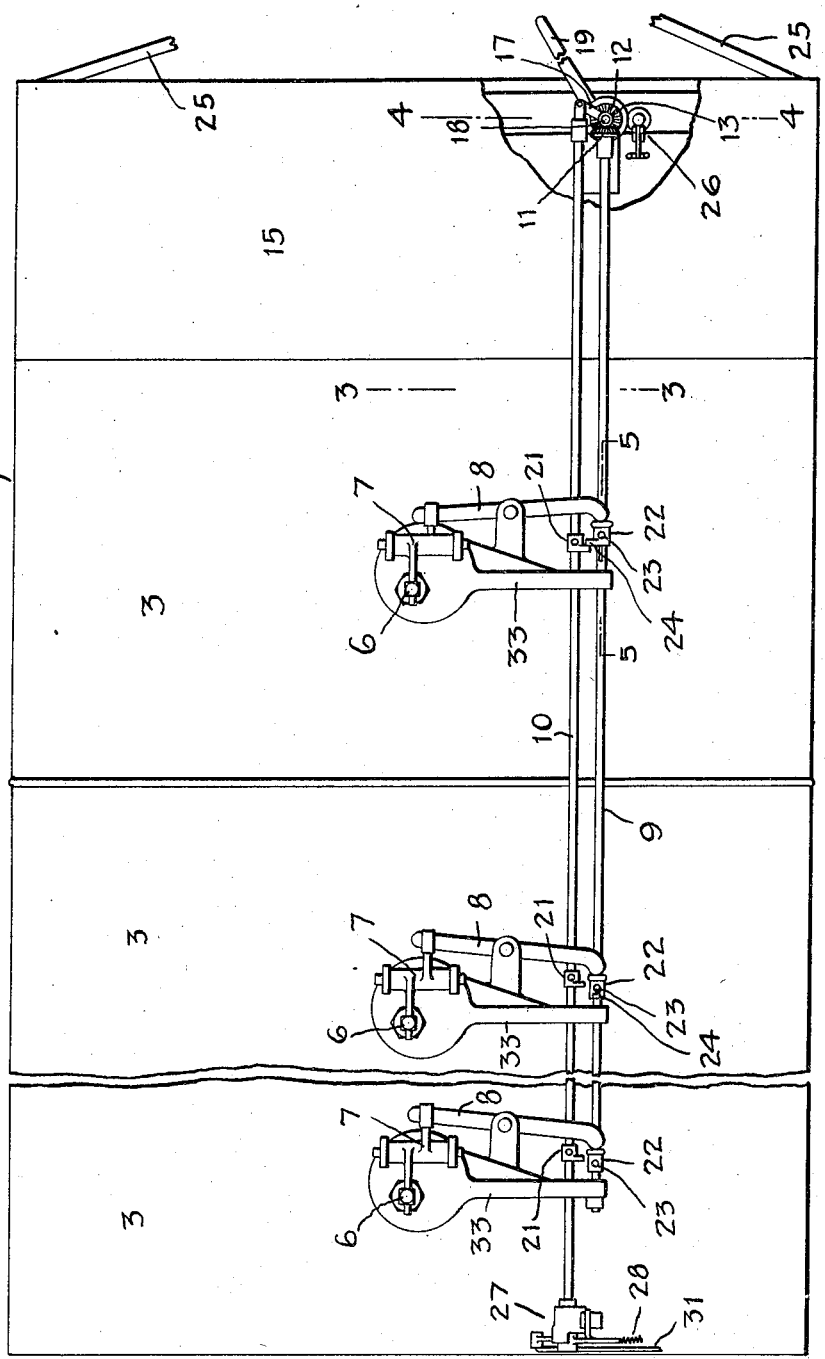

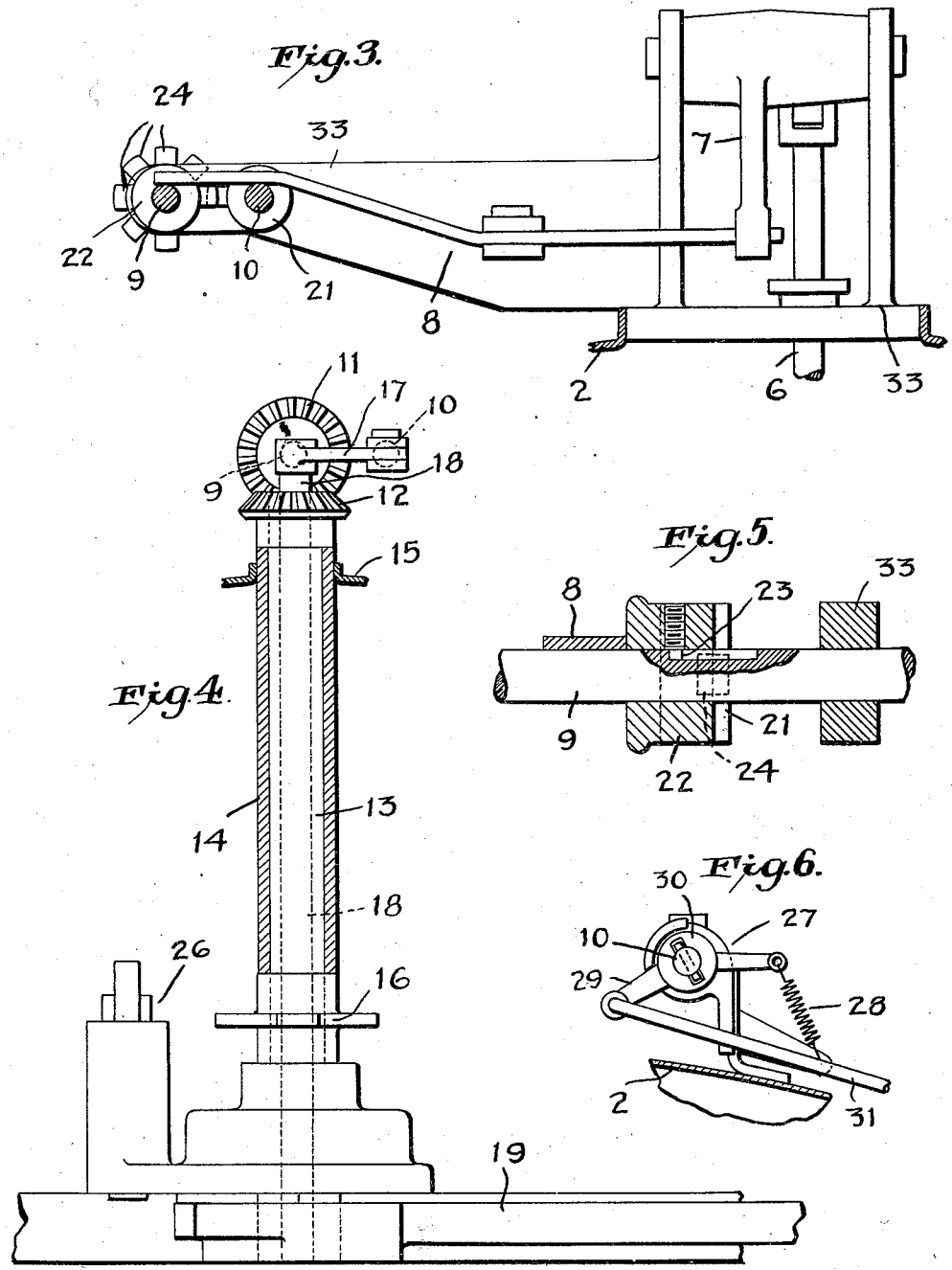

Patented Apr. 15, 1930

1,755,153

UNITED STATES PATENT OFFICE

PAUL S. SHIELD, OF CINCINNATI, OHIO, ASSIGNOR TO AUGUSTINE DAVIS, JR., OF CINCINNATI, OHIO

SELECTIVE VALVE-ACTUATING MEANS

Application filed January 30, 1929. Serial No. 336,087.

This invention relates to means for selectively operating valves. The invention finds an application in connection with valves pertaining to the chambers of a multiple compartment vehicle tank.

The object is to provide simple, effective and convenient mechanism, and more particularly mechanism in which one of two shafts extending lengthwise of a series of valve connections serves to open a selected valve, while the other of said shafts is operable for purpose of selection.

In the accompanying drawings forming part hereof:

Fig. 1 is a side elevation of a truck tank embodying the invention, a portion of the tank intermediate the ends being broken out and a wall of the control box at the rear end of the tank being partly broken away, the door of this box being open and broken away and the valve mechanism being shown in an actuated condition with one of the valves open; Fig. 2 is a plan view corresponding to Fig. 1, with a portion of the top of the control box broken away; Fig. 3 is a section taken on the line 3—3 of Fig. 2; Fig. 4 is a view partly in elevation and partly in section on the line 4—4 of Fig. 2, showing the operating handle in the position in which it lies with all the valves closed; Fig. 5 is a section taken on the line 5—5 of Fig. 2; and Fig. 6 is an elevation looking at the cab release device at the front end of the actuating shaft.

The drawings illustrate a vehicle tank 2, divided or separated into a plurality of separate compartments 3. The particular tank shown has a bottom outlet for each compartment commanded by a valve 4 normally seated by a spring 5. In the absence of a spring, the valves may be closed by the liquid. Lifting connections 6 extend from the valves upward and through the tops of the compartments, where they may be connected with bell-crank rockers 7, which in turn may be connected with levers 8 pivoted intermediate their ends, these levers being illustrative of members which are operatively connected with the several valves.

Two shafts 9 and 10 extend longitudinally over the top of the tank illustrated. The shaft 9 is a selective shaft provided at its rear end with a bevel gear 11, which meshes another bevel gear 12 on the upper end of a tubular shaft 13, which passes downward through a fixed tube 14, which pierces the top of a customary box 15, at the rear end of the tank, this box being known as a bucket-box or control box. On the lower end of the tubular shaft 13 there is a hand wheel 16 for turning the shaft 9 to one of a number of positions. An index, not shown, may be provided in connection with this hand wheel to assist the operator in determining the proper positions.

The rear end of the actuating shaft 10 is connected by a crank arm 17 with the upper end of a vertical shaft 18, which passes through the tubular shaft 13. On the lower end of this shaft 18, within the bucket-box, there is an operating handle 19, which is adapted to be caught behind a holding lug 20, as in the Emmich Patent 1,467,717, the Davis & Betts Patent 1,562,300, and the Fuller & Betts Patent 1,566,472.

The longitudinally movable actuating shaft 10 is provided with a plurality of longitudinally spaced actuating lugs 21, there being one of these lugs for each valve to be controlled.

On the selecting shaft 9 there is a corresponding number of connector collars 22. These connectors have connections 23 with the selecting shaft 9, which permit them to have limited sliding movement in the longitudinal direction in this shaft, but compel them to turn with it. These connectors have projecting lugs 24, which project in different angular relations. The connector collars are arranged to abut the levers 8, and their lugs 24 are adapted to align one at a time with the actuating lugs or elements 21 of the actuating shaft 10.

In order to select a particular valve to be opened, the hand wheel 16 is turned to the proper position. This places the lug 21 of the connector collar 22, corresponding to that particular valve, in line with the corresponding actuating lug 21 on the actuating shaft 10. The operator then grasps the hand lever 19 and turns the shaft 18, thereby moving the shaft 10 toward the rear and through the connector collar 22 and the connections 8, 7, and 6, opening the selected valve.

As in the Davis & Betts patent, the handle 19 may interfere with the closing of the door 25 of the bucket-box, so that the door can not be closed until the valve or valves which have been opened have been closed. A thermal release 26 is preferably provided in connection with the handle 19 to bring about closing of the open valve or valves in event of fire at the rear end of the tank, this thermal release being similar to that of the Emmich patent.

As in the Fuller & Betts patent, a so-called cab-release 27 is provided at the forward portion of the actuating shaft 10 for turning the latter to bring about release of an opened valve in case it should be necessary to effect such closing from the forward end of the tank. Such turning movement rocks the actuating lugs 21, so that the connector collar 22 of the valve which was opened is free to move forward thereby permitting the valve to close. In the present construction, however, the shaft 10 does not have to be disconnected with the operating means at the rear end for the purpose of this releasing operation, since the shaft 10 does not have to move forward to permit the release of the opened valve. Accordingly, a permanently connected swivel connection is provided between the rear end of the shaft 10 and the crank arm 17.

While the preferred form of the invention has been described in detail, it will be understood that numerous other arrangements may be devised without departing from the essential plan.

In connection with the cab-release, or front-end release, it may be noted that a spring 28 normally holds an arm 29 on a rotatable sleeve 30, with which the front end of the actuating shaft 10 is slidably connected, against a stop 31, so that the actuating lugs 21, which are all in line, are kept in positions which enable them to act upon the lugs 24 when the actuating shaft is moved rearward. The sleeve 30 and thereby the shaft 10 can be turned by a suitable handle or link 31 connected to the arm 29, so as to rock the actuating lugs 21 to positions in which none of them will engage the lugs 24.

The shafts 9 and 10 are journaled in suitable brackets 33 on top of the tank, the levers 7 and 8 being likewise mounted on these brackets.

I claim:

1. Means for selecting and actuating any of a plurality of valves comprising members operatively related to the valves, an actuating shaft and actuating elements operated thereby, connectors adapted to be interposed in operative relation between said actuating elements and said members, means for causing any of said connectors to be in operative relation and others to be out of such relation, said means comprising a selecting shaft extending in the same direction as the actuating shaft and adapted to be moved to any one of a number of positions, said shaft being provided with means for controlling said connectors, means for operating said selecting shaft, and means for operating said actuating shaft.

2. Means for selecting and actuating any of a plurality of valves comprising members operatively related to the valves, an actuating shaft and actuating elements operated thereby, connectors adapted to be interposed in operative relation between said actuating elements and said members, means for causing any of said connectors to be in operative relation and others to be out of such relation, said means comprising a selecting shaft extending in the same direction as the actuating shaft and adapted to be moved to any one of a number of positions, said shaft being provided with means for controlling said connectors, and means for separately operating said shafts, the last named means comprising two concentric operating shafts at an angle to and connected respectively with said selecting and actuating shafts, and means for operating said concentric shafts.

3. Means for selecting and actuating any of a plurality of valves comprising members operatively related to the valves, an actuating shaft and actuating elements operated thereby, connectors adapted to be interposed in operative relation between said actuating elements and said members, means for causing any of said connectors to be in operative relation and others to be out of such relation, said means comprising a selecting shaft extending in the same direction as the actuating shaft and adapted to be moved to any one of a number of positions, said shaft being provided with means for controlling said connectors, and means for separately operating said shafts, the last named means comprising two concentric operating shafts at an angle to and connected respectively with said selecting and actuating shafts, and means for operating said concentric shafts.

4. Means for selecting and actuating any of a plurality of valves comprising members operatively related to the valves, an actuating shaft and actuating elements operated thereby, connectors adapted to be interposed in operative relation between said actuating elements and said members, means for causing any of said connectors to be in operative relation and others to be out of such relation, said means comprising a selecting shaft extending in the same direction as the actuating shaft and adapted to be moved to any one of a number of positions, said shaft being provided with means for controlling said connectors, operating means for imparting longitudinal motion to one of said shafts, and operating means for imparting turning motion to the other of said shafts.

5. Means for selecting and actuating any of a plurality of valves comprising members operatively related to the valves, a longitudinally movable actuating shaft and actuating elements operated thereby, connectors adapted to be interposed in operative relation between said actuating elements and said members, means for causing any of said connectors to be in operative relation and others to be out of such relation, said means comprising a rotatable selecting shaft extending in the same direction as the actuating shaft and adapted to be moved to any one of a number of positions, said shaft being provided with means for controlling said connectors, means for operating said selecting shaft rotatably, and means for operating said actuating shaft longitudinally.

6. Means for selecting and actuating any of a plurality of valves comprising members operatively related to the valves, a longitudinally movable actuating shaft provided with actuating elements, a rotatable selecting shaft parallel with said actuating shaft, connectors slidable on said selecting shaft but compelled to turn therewith, said connectors adapted to be interposed in operative relation between said actuating elements and said members and having portions in different angular relations, operating means for turning said selector shaft to any one of a number of positions, and operating means for moving said actuating shaft longitudinally to open a selected valve.

7. Means for selecting and actuating any of a plurality of valves comprising members operatively related to the valves, a longitudinally movable actuating shaft provided with actuating elements, a rotatable selecting shaft parallel with said actuating shaft, connectors slidable on said selecting shaft but compelled to turn therewith, said connectors adapted to be interposed in operative relation between said actuating elements and said members and having portions in different angular relations, operating means for turning said selector shaft to any one of a number of positions, and operating means for moving said actuating shaft longitudinally to open a selected valve, means for holding the last-named means in actuated position, a permanently connected swivel connection between said actuating shaft and its operating means, and means connected with another part of said actuating shaft whereby said shaft can be turned to release a valve which is open.

8. Means for selecting and actuating any of a plurality of valves comprising members operatively related to the valves, a longitudinally movable actuating shaft provided with actuating elements disposed in alignment, a rotatable selecting shaft parallel with said actuating shaft, connectors controlled by said selecting shaft adapted to be interposed between said actuating elements and said members, said connectors being in different angular relations, means for turning said selecting shaft, means for moving said actuating shaft longitudinally to open a selected valve, means for holding said actuating shaft in actuated position, and means whereby said actuating shaft can be turned to relese an open valve.

PAUL S. SHIELD.